Aug. 30, 1960

H. B. LEIGHTON 2,950,544

BILINGUAL COMMUNICATOR

Filed Nov. 17, 1958

Dear
30—○ You are probably surprised to receive this ——
——. ○ ○ We arrived home safely ——
let ○ me ○ us know when to expect you.
Yours truly
Instructions:——

Fig. 2

Querido
38—() Problamente esta Vd. sorprendido de escibir ——
—— .()Llegué ()Llegamos sin novedad ——
de ()avisarme ()avisarnos cuando lo esperamos.
Sinceramente suyo

Fig. 3

Querido
30—○ Tuvé ○ Tuvimos mucho gusto en recibir ——
por el mes de
non veremos.
Sinceramente
Instructiones:——

Fig. 4

Dear
38—() I was () We were indeed pleased to receive ——
perhaps about
Sincerely INVENTOR.
HENRY B. LEIGHTON
BY Knox & Knox Aug. 30, 1960  H. B. LEIGHTON  2,950,544
BILINGUAL COMMUNICATOR Filed Nov. 17, 1958  2 Sheets-Sheet 2

INVENTOR.
HENRY B. LEIGHTON
BY Knox & Knox

United States Patent Office 2,950,544
Patented Aug. 30, 1960

2,950,544

BILINGUAL COMMUNICATOR

Henry B. Leighton, 1149 Elmwood Drive, Escondido, Calif.

Filed Nov. 17, 1958, Ser. No. 774,268

6 Claims. (Cl. 35—35)

The present invention relates generally to bilingual communication and more particularly to a bilingual letter assembly or language-gram.

The primary object of this invention is to provide a language-gram with which two people may correspond with each other in different languages without either having any understanding of the other's language.

It is another object of this invention to provide a bilingual communication device which can be employed by persons unable to write in their own language since no actual writing is required, even by the sender of the correspondence initiating letter.

Another object of this invention is to provide a language-gram which is a composite letter having an initial letter portion and a reply portion, the two being related in phraseology so that intelligent communication can be carried on.

Another object of this invention is to provide a language-gram in which each correspondent has a letter capable of transmitting intelligence, usually as a choice of phrases, in his own language and selects the desired portions thereof to compose a complete letter, the selections being simultaneously marked on a second portion of the letter in the other correspondent's language without the need for translation.

A further object of this invention is to provide a language-gram having means for checking the alignment of the various portions thereof to ensure accurate marking of the selected phrases thereof.

Finally, it is an object to provide a language-gram of the aforementioned character which is simple and convenient to use and which is easily understood by both parties.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Figures 1 to 4 illustrate the printed faces of pages 1 to 4, respectively, of the language-gram;

Similar characters of reference indicate similar or identical elements and portions throughout the specification and throughout the views of the drawing.

Figure 5:
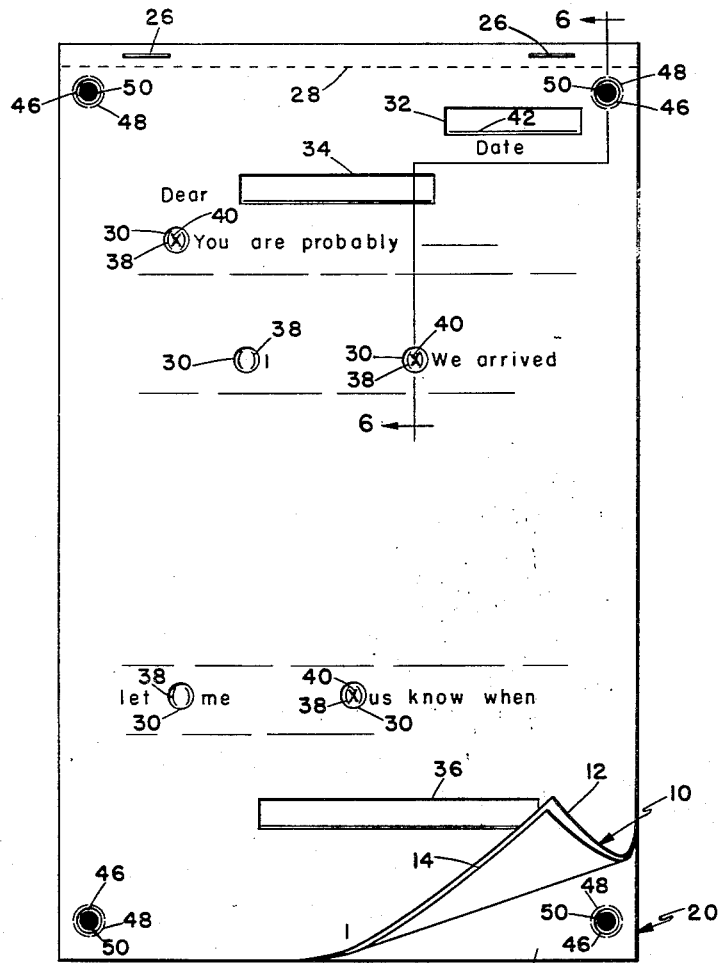
Figure 5 is a front face view of the assembled language-gram, slightly enlarged.
Figure 6:
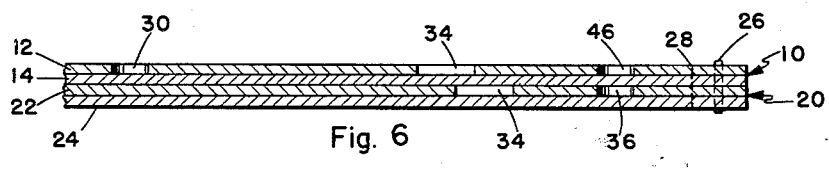
Figure 6 is an enlarged fragmentary sectional view taken on the line 6—6 of Figure 5.

The language-gram comprises four pages arranged in pairs to form an initiating letter portion 10 and a reply letter portion 20, pages 1 and 2 constituting the initiating letter portion and pages 3 and 4 the reply letter portion; each letter portion including a guide sheet and a message sheet. Thus the uppermost sheet is guide sheet 12, the next sheet is message sheet 14, the third sheet is guide sheet 22 and the bottom sheet is message sheet 24. The four sheets are secured together in accurate register by means of staples 26, or the like, adjacent the top edge of the assembly and each page is perforated, as at 28 adjacent and parallel to the top edge for tear-off purposes.

The guide sheet 12, of the initiating letter, has imprinted thereon intelligence which will usually take the form of a plurality of selected words and phrases arranged in the form of a letter. In the simple form illustrated, each individual phrase or sentence is preceded by a small circular perforation or opening 30 through the page. Obviously, the critical feature here involved is the necessity for the opening 30 to be positionally associated with the corresponding phrase in some simple, easily recognized relationship. In the case of multiple choice phrases or words, each phrase or word is preceded by one of said openings. At the heading of the page, suitable slots 32 and 34 are cut for the date and name of the recipient, respectively, while at the end of the printed message a slot 36 is provided for signature. The message on the guide sheet 12 is printed in the native tongue of the sender, so that he can select the necessary phrases to form a complete letter or message.

The message sheet 14 is imprinted with intelligence in phraseology corresponding to that on guide sheet 12, but in the tongue understood by the intended recipient. The various phrases are carefully aligned so as to fit exactly below their counterparts when the two sheets are secured together, and it may be found necessary to adjust the spacing of certain portions of the printed matter on either page to ensure proper alignment. Each phrase on the message sheet 14 is preceded by parentheses 38 which, when aligned, are visible through the openings 30. Thus when a particular phrase is selected on the guide sheet 12, the mark actually is made within the parentheses 38 on message sheet 14, as exemplified by the marked crosses 40 in Figure 5. The message sheet 14 may also be underlined, as at 42, to correspond with slots 32, 34 and 36, although the underlining is not essential.

In the reply letter 20, the guide sheet 22 is printed with selected phrases suitable for a reply to the initiating letter, the phrases of the guide sheet 22 this time being in the language of the recipient of the initiating letter. As in guide sheet 12, each phrase on the guide sheet 22 is preceded by an opening 30 and further slots 32, 34 and 36 are provided for date, name and signature, respectively. In addition, a slot 44 may be provided for written information not contained in the printed matter, wherever such is necessary and this feature may be included in the guide sheet 12 if needed. The message sheet 24 carries the phraseology equivalent to that on the guide sheet 22, but in the language of the original sender, the phrases being properly aligned to register with their counterparts in the other language and each being preceded by parentheses 38. Thus the recipient of the initiating letter 10 can select and mark the appropriate portions of the reply letter 20, through the openings 30, onto the reply message sheet 24, which is then returned to the party originating the correspondence.

To ensure alignment of the various sheets, the guide sheets 12 and 22 each have indexing apertures 46 adjacent their corners, said apertures preferably being outlined by printed circles 48. The message sheets 14 and 24 are each imprinted with spots or similar demarcations 50 adjacent their corners, the spots being positioned to register concentrically with the apertures 46. By visually checking the corners of each letter to ensure that the indexing apertures 46 and spots 50 are concentric, the user knows that the printed matter on each message sheet is properly aligned for correct marking through its guide sheet. Suitable instructions for use are printed in the appropriate language on both guide sheets 12 and 22 adjacent their lower edges.

The language-gram is illustrated as a social type letter in English and Spanish by way of an example. Any two languages may be used, however, and neither user need know how to read the other's language in order to send an intelligible letter. This is particularly important when one written language uses an alphabet of completely different character from the other and the symbols of each language may be unintelligible to the other person. The language-gram is not by any means limited to social letters, but may be used for exchange of technical information or for questionnaire purposes.

In recapitulation, in use, the original sender marks the selected portions of the initiating letter 10, then tears off the guide sheet 12 along its perforations 28. The message sheet 14 and the complete reply letter 20 are sent to the recipient who keeps the message sheet 14. The recipient in turn marks the selected portions of the reply letter 20 and tears off the guide sheet 22, the message sheet 24 being returned to the original sender. In this manner, one person writing to another of a different tongue, provides the other person with a ready made means to reply. The scope of printed matter involved is virtually limitless and many types of language-grams can be formulated for exchange of greetings on special occasions.

The propensities of this invention in the field of international relations, especially in the building of international goodwill, will be clearly appreciated, and the possibilities of the invention in the fields of foreign religious educaton and propaganda are unlimited.

The operation of this invention will be clearly comprehended from a consideration of the foregoing description of the mechanical details thereof, taken in connection with the drawing and the above recited objects. It is understood that minor variation from the form of the invention disclosed herein may be made without departure from the spirit and scope of the invention, and the specification and drawings are to be considered as merely illustrative rather than limiting.

I claim:

1. A bilingual communicator comprising: a guide sheet bearing, on its upper face, intelligence in a first language in an ordered arrangement; a message sheet in accurate sub-imposed relation to the guide sheet and bearing a corresponding arrangement of the same intelligence in a second language indexed vertically beneath the guide sheet; means to mark portions of said intelligence in a second language on said message sheet, enabling selection of said portions as a message, with the first mentioned intelligence as the sole guide for such marking.

2. A bilingual communicator comprising: a guide sheet bearing intelligence in a first language in a linear arrangement on a face of the sheet; a message sheet in accurate subimposed relation to the guide sheet and bearing a corresponding linear arrangement of the same intelligence in a second language indexed vertically beneath the first mentioned linear arrangement; means to mark portions of said corresponding linear arrangement, with the first mentioned intelligence the sole guide for such marking, enabling selection of said portions as a message in said second language.

3. A bilingual communicator comprising: a guide sheet having on its upper face intelligence in a first language in an ordered arrangement, and having openings therein critically positioned with reference to portions of said intelligence; and a message sheet immediately beneath the guide sheet having a correspondingly ordered arrangement of the same intelligence in a second language on its upper face, whereby portions of the message sheet may be marked, through the said openings, to correspond with selected portions of the intelligence in said first language, enabling selection of said portions as a message in said second language.

4. A bilingual communicator comprising: a guide sheet bearing, on its upper face, intelligence in a first language in an ordered arrangement; a message sheet in accurate sub-imposed relation to the guide sheet and bearing a corresponding arrangement of the same intelligence in a second language indexed vertically beneath the guide sheet; means to mark portions of said message sheet with the first mentioned intelligence as the sole guide for such marking, enabling selection of said portions as a message in said second language; said guide sheet and message sheet each having simultaneously visible, positionally corresponding indexing means thereon to facilitate accurate register of one sheet with the other.

5. A bilingual communicator comprising: a guide sheet having on its upper face intelligence in a first language in an ordered arrangement, and having openings therein critically positioned with reference to portions of said intelligence; and a message sheet immediately beneath the guide sheet having a correspondingly ordered arrangement of the same intelligence in a second language on its upper face, whereby portions of the message sheet may be marked, through the said openings, to correspond with selected portions of the intelligence in said first language, enabling selection of said portions as a message in said second language.

6. A language-gram, comprising: an initiating letter and a reply letter; each of said letters including a guide sheet and a message sheet; said initiating guide sheet having on its upper face intelligence in a first language in ordered linear arrangement, and having openings therein critically positioned with reference to portions of said intelligence; said initiating message sheet havng on its upper face a correspondingly ordered arrangement of the same intelligence in a second language; said reply guide sheet having on its upper face intelligence in said second language in ordered linear arrangement, and having openings therein critically positioned with reference to portions of the intelligence; said reply message sheet having on its upper face a correspondingly ordered arrangement of the last mentioned intelligence in said first language; said guide sheets each being secured to the corresponding message sheet with the related intelligence thereon in accurate alignment, whereby portions of the intelligence on each guide sheet may be marked through said openings onto the corresponding message sheet.

References Cited in the file of this patent

UNITED STATES PATENTS

| 2,503,130 | Poritz | Apr. 4, 1950 |
| 2,725,644 | Wade | Dec. 6, 1955 |

FOREIGN PATENTS

| 12,735 | Great Britain | Sept. 24, 1908 |